United States Patent
Miyamoto et al.

(10) Patent No.: US 10,695,676 B2
(45) Date of Patent: Jun. 30, 2020

(54) STORAGE MEDIUM STORING GAME PROGRAM, INFORMATION PROCESSING SYSTEM, INFORMATION PROCESSING DEVICE, AND GAME PROCESSING METHOD

(71) Applicant: NINTENDO CO., LTD., Kyoto (JP)

(72) Inventors: Shigeru Miyamoto, Kyoto (JP); Takashi Tezuka, Kyoto (JP); Norihito Ito, Kyoto (JP); Yugo Hayashi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 16/034,507

(22) Filed: Jul. 13, 2018

(65) Prior Publication Data

US 2019/0030436 A1 Jan. 31, 2019

(30) Foreign Application Priority Data

Jul. 31, 2017 (JP) .................................. 2017-147994

(51) Int. Cl.
*A63F 13/55* (2014.01)
*A63F 13/69* (2014.01)
(Continued)

(52) U.S. Cl.
CPC .............. *A63F 13/67* (2014.09); *A63F 13/47* (2014.09); *A63F 13/49* (2014.09); *A63F 13/55* (2014.09);
(Continued)

(58) Field of Classification Search
CPC ...................................................... A63F 13/45
See application file for complete search history.

(56) References Cited

U.S. PATENT DOCUMENTS 6,139,433 A * 10/2000 Miyamoto ............. G05G 9/047
345/474
2008/0268943 A1 * 10/2008 Jacob ...................... A63F 13/10
463/23
(Continued)

FOREIGN PATENT DOCUMENTS

JP 2011-101754 5/2011

OTHER PUBLICATIONS

Nintendo, Super Mario Bros game manual, 1985 (Year: 1985).*
(Continued)

*Primary Examiner* — Damon J Pierce
(74) *Attorney, Agent, or Firm* — Nixon & Vanderhye PC

(57) ABSTRACT

An example of an information processing device generates a game field for each of a plurality of game stages. The information processing device executes a game process of controlling a player object in response to an operation by a user in a game stage for which the game field has been generated. The information processing device determines whether the user has cleared or failed to clear the game stage. In response to a determination that the user has cleared the game stage, the information processing device starts the game process for a next game stage while maintaining a state of the player object at the time of clearing. On the other hand, in response to a determination that the user has failed to clear the game stage, the information processing device starts the game process for a next game stage.

19 Claims, 11 Drawing Sheets

(51) Int. Cl.
    *A63F 13/67*    (2014.01)
    *A63F 13/47*    (2014.01)
    *A63F 13/49*    (2014.01)
    *A63F 13/46*    (2014.01)

(52) U.S. Cl.
    CPC ............... *A63F 13/46* (2014.09); *A63F 13/69* (2014.09); *A63F 2300/554* (2013.01); *A63F 2300/6027* (2013.01)

(56) References Cited

U.S. PATENT DOCUMENTS

| | | | | |
|---|---|---|---|---|
| 2010/0197389 | A1* | 8/2010 | Ueda ....................... | A63F 13/12 463/30 |
| 2011/0111851 | A1 | 5/2011 | Hayashida et al. | |
| 2013/0097643 | A1* | 4/2013 | Stone ................. | H04N 21/4781 725/61 |
| 2013/0324265 | A1* | 12/2013 | Takagi ................... | G06F 17/00 463/43 |
| 2014/0031112 | A1* | 1/2014 | Dezaki ................... | A63F 13/40 463/29 |
| 2017/0312629 | A1* | 11/2017 | Kosuge ................... | A63F 13/12 |
| 2018/0005483 | A1* | 1/2018 | Washington ......... | G07F 17/3213 |

OTHER PUBLICATIONS

YouTube video, Super Mario Bros. (1985) Full Walkthrough NES Gameplay, 2014 (1985), Nintendo (Year: 1985).*

"Super Mario Run Review, Walkthrough, and Defeating Bowser" https://www.bing.com/videos/search?q=Super+Mario+run+reviews&view=detail&mid=AD09036BDBB388FC6B5DAD09036BDBB388FC6B5D&FORM=VIRE, Dec. 17, 2016 (Year: 2016).*

Jose Otero, IGN, "Super Mario Run Review", https://web.archive.org/web/20161215204954/https://www.ign.com/articles/2016/12/15/super-mario-run-review, Dec. 15, 2016 (Year: 2016).*

IGN, "What Super Mario Run Doesn't Tell You" in https://www.ign.com/wikis/super-mario-run/What_Super_Mario_Run_Doesn%27t_Tell_You, Dec. 18, 2016 (Year: 2016).*

TVlropes, "Skippable Boss" https://web.archive.org/web/20160730054500/http://tvtropes.org/pmwiki/pmwiki.php/Main/SkippableBoss, Jul. 30, 2016 (Year: 2016).*

[NEWS] "Legendary School Zone", Mado-no-mori [online], Sep. 12, 2007, searched on Apr. 8, 2019, URL, https://forest.watch.impress.cojp/ article/2007 /09/12/ densetsuugakuro.html (2 pgs.).

Review of "Absolute Insanity", [online], Apr. 6, 2015, searched on Apr. 8, 2019, URL, http:/ /fgwl.blog.fc2.com/blog-entry-246.html?sp (6 pgs).

Review of "Thunder and Lightning V", 4gamer.net [online], Feb. 27, 2016, searched on Apr. 17, 2019, URL, https:/ /www.4gamer.net/ games/262/G026225/20160224115/ (4 pgs.).

Notice of Reasons for Refusal dated Apr. 25, 2019 in the corresponding Japanese Patent Application No. 2017447994 (4 pgs.) with its machine translation (3 pgs.).

* cited by examiner

Fig.9

| GAME PROGRAM |
| --- |
| BASIC FIELD DATA |
| PARTIAL FIELD DATA |
| FIELD DATA FOR CONTINUOUS PLAY MODE |
| ⋮ |
| PLAYER OBJECT DATA |
| SELECTION METHOD DATA |
| FIRST COIN DATA |
| SECOND COIN DATA |

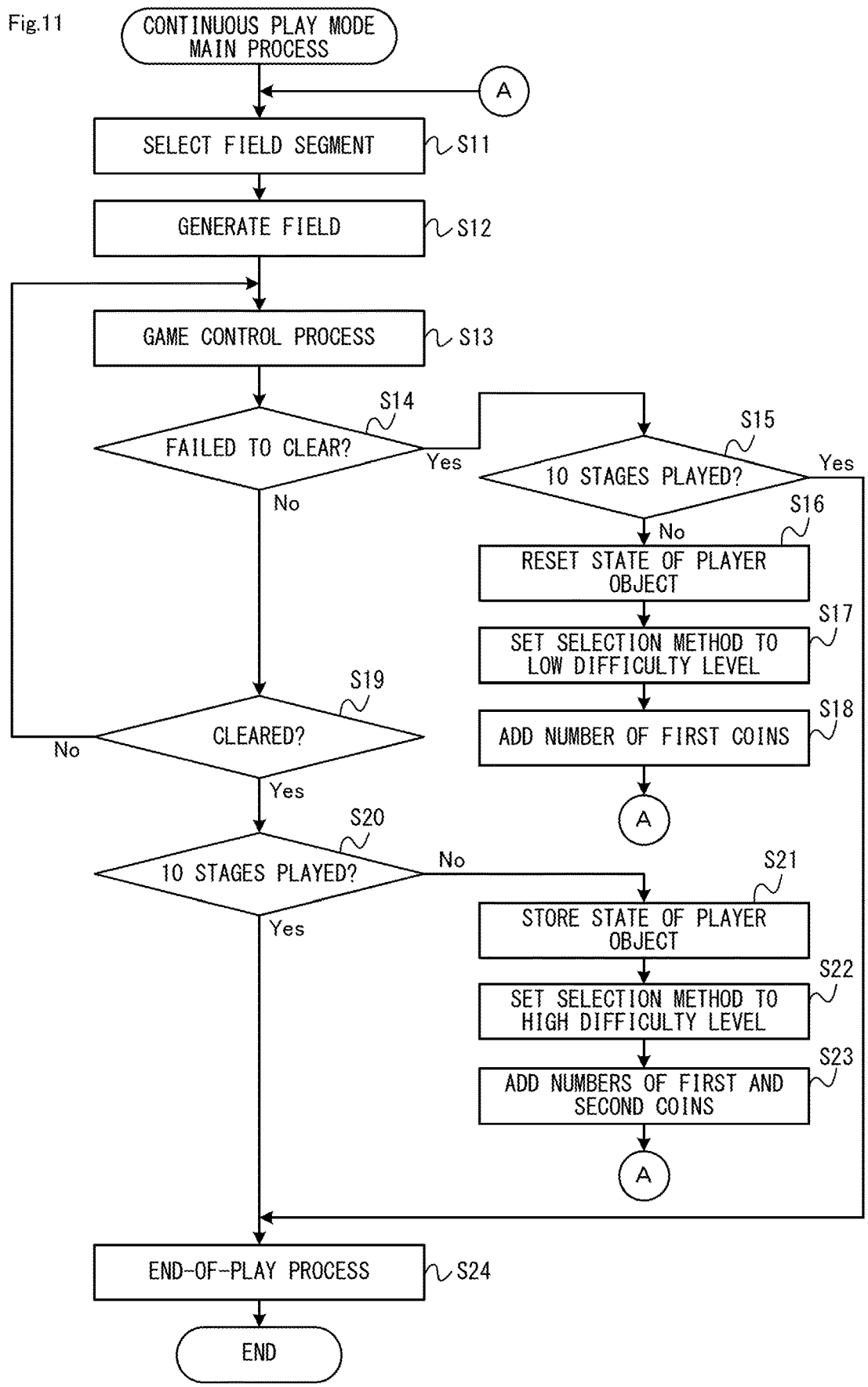

STORAGE MEDIUM STORING GAME PROGRAM, INFORMATION PROCESSING SYSTEM, INFORMATION PROCESSING DEVICE, AND GAME PROCESSING METHOD

CROSS REFERENCE TO RELATED APPLICATION

The disclosure of Japanese Patent Application No. 2017-147994, filed on Jul. 31, 2017, is incorporated herein by reference.

FIELD

The present technique relates to a storage medium storing a game program whereby the user can play a game including a plurality of game stages, an information processing system, an information processing device, and a game processing method.

BACKGROUND AND SUMMARY

There are conventional games that are played by successively clearing a plurality of game stages. In games of this type, one game stage is the minimum unit of game play. That is, a game play stops when the player clears one game stage, and then the game play resumes at the start of the next game stage.

With such conventional games, only one game stage is played over a continuous game play period, and the game play may possibly become monotonous and bore the user. When the user plays a plurality of game stages, the game play discontinues at the end of each game stage, possibly making the user feel like the game is interrupted.

Therefore, the present application discloses a storage medium storing a game program whereby the game play is unlikely to be monotonous, an information processing system, an information processing device, and a game processing method. The present application also discloses a storage medium storing a game program whereby the user can play the game with a good tempo, an information processing system, an information processing device, and a game processing method.

(1)

An example of a storage medium described herein is a non-transitory computer-readable storage medium storing a game program to be executed on a computer of an information processing device. The game program causes the computer to function as a generation unit and a game process unit. The generation unit generates a game field for each of a plurality of game stages. The game process unit executes a game process of controlling a player object in response to an operation by a user in a game stage for which the game field has been generated.

The game process unit determines whether the user has cleared or failed to clear the game stage. In response to a determination that the user has cleared the game stage, the game process unit starts the game process for a next game stage while maintaining a state of the player object at the time of clearing. In response to a determination that the user has failed to clear the game stage, the game process unit starts the game process for a next game stage.

With configuration (1) above, the game program allows the user to continuously play a plurality of game stages. Therefore, the user can experience a plurality of game stages in a single game play, and it is possible to provide the user with a game play that is less likely to be monotonous. With configuration (1) above, the next game stage is started, irrespective of whether the user has cleared or failed to clear the current game stage, and the user can therefore play the game with a good tempo.

(2)

In response to the determination that the user has failed to clear the game stage, the game process unit may start the game process for the next game stage while setting the state of the player object to an initial state.

With configuration (2) above, the state of the player object for the next game stage is varied between when the user has cleared the game stage and when the user has failed to clear the game stage. Thus, it is possible to motivate the user to play so as not to fail to clear the current stage. Therefore, it is possible to avoid detracting from the playability of the game in an embodiment where the user can play the next stage even if the user fails to clear the current stage.

(3)

The generation unit may generate the game field of each game stage by selecting, based on a predetermined probability, and using at least one of a plurality of game fields that are provided in advance.

With configuration (3) above, game fields to be played continuously are generated with a degree of randomness, and it is therefore possible to provide combinations of game fields that are less likely to bore the user.

(4)

In response to the determination that the user has cleared or failed to clear a game stage, the generation unit may generate the game field for the next game stage.

With configuration (4) above, the game field for the next game stage is generated after the end of the current game stage. Then, as compared with a case in which game fields for a plurality of game stages are generated before the start of a game play, it is possible to shorten the amount of time until the start of the first game stage.

(5)

The game field generated by the generation unit for the next game stage may be varied between when it is determined that the user has cleared the game stage and when it is determined that the user has failed to clear the game stage.

With configuration (5) above, the game field for the next game stage can be set to a field of appropriate content depending on whether the user has cleared or failed to clear the current game stage. For example, when the user has failed to clear the current game stage, it is possible to lower the difficulty level of the next game stage as compared with a case in which the user has cleared the current game stage. Thus, it is possible to adjust the difficulty level of the game stage depending on the user's gaming skills.

(6)

The generation unit may determine the game field for the next game stage based on the user's play result for the game stage.

With configuration (6) above, it is possible to set the game field for the next game stage to a field of appropriate content depending on the play result of the current game stage. For example, when the play result is better than a predetermined reference level, the next game stage may be set to a special stage (e.g., a bonus stage), and it is therefore possible to improve the playability of the game.

(7)

The game process unit may end a single game play on a condition that the number of game stages that the user has cleared or failed to clear or the number of game stages that the user has cleared has reached a predetermined number.

With configuration (7) above, a single game play is ended when the number of game stages the user has played or the number of game stages the user has cleared has reached a predetermined number. Thus, it is easy for the user to understand when a single game play ends.

(8)

The game process unit may end a single game play on a condition that the number of game stages that the user has cleared or failed to clear has reached a predetermined number. The game process unit may calculate a numerical value representing a play result for each game stage during the single game play. The game process unit may calculate, as a numerical value representing a play result for the single game play, a sum of the numerical values that have been calculated for the game stages during the single game play.

With configuration (8) above, the numerical value representing the play result for a single game play is the sum of numerical values that have been calculated for the game stages, irrespective of whether the user has cleared or failed to clear each of the game stages. That is, the numerical value representing the play result for a single game play includes those numerical values for the game stages that the user has failed to clear. Therefore, it is possible to calculate, as the numerical value representing the play result for a single game play, a numerical value that reflects the play results for those game stages that the user has failed to clear.

(9)

In the game process, the game process unit may execute a first process of automatically advancing the game, independent of operations by the user, and a second process of controlling an action of the player object in response to an operation by the user.

With configuration (9) above, in each game stage, the game advances automatically, irrespective of operations by the user. Therefore, with configuration (9) above, the game advances automatically through a plurality of game stages in a single game play, and the transition from one game stage to the next is also done automatically. Thus, the game can be played uninterruptedly throughout the single game play.

(10)

The game process unit may execute a process of moving the player object in a predetermined direction in the game field as the first process, and execute a process of causing the player object to make an action that is different from the movement of the first process in response to an operation by the user as the second process.

With configuration (10) above, the player object is controlled to move automatically to advance through the game, while the player object makes an action that is difference from the movement in response to an operation by the user. Thus, the user can play the game uninterruptedly and can cause the player object to make an action in accordance with an operation by the user.

(11)

The generation unit may generate a game field including a goal therein for each game stage. In the game process, the game process unit may determine that the user has cleared a game stage when the player object has reached the goal.

With configuration (11) above, since a goal is set in each of the game stages in a single game play, it is possible to give the user, for each game stage, the sense of achievement for clearing the stage. Since the user can clearly recognize the separation between game stages, the user is less likely to feel that the game is monotonous even when the user is made to continuously play a plurality of game stages.

(12)

The game process unit may start a game process by placing the player object at a predetermined start position in the next game stage, irrespective of whether there is an operation by the user, in response to a determination that the user has cleared or failed to clear the game stage.

With configuration (12) above, since the player object is automatically placed at the start position in the next game stage, it is possible to allow the user to play a plurality of game stages uninterruptedly.

Note that disclosed herein is an example of an information processing device or an information processing system configured to execute the processes of the various units set forth in (1) to (12) above (this is not limited to embodiments in which the processes are executed by a program). Also disclosed herein is an example of a game processing method in which the processes of the various units set forth in (1) to (12) above are executed by a computer.

With the storage medium storing a game program, the information processing system, the information processing device and the game processing method set forth above, it is possible to make the game play unlikely to be monotonous. With the storage medium storing a game program, the information processing system, the information processing device and the game processing method set forth above, the user can play the game with a good tempo.

These and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a diagram showing an example of data used in an information process by a non-limiting information processing system;

FIG. 11 is a flow chart showing a flow of an example of an information process executed by a non-limiting information processing device.

DETAILED DESCRIPTION OF NON-LIMITING EXAMPLE EMBODIMENTS

1. General Configuration of System

Figure 1:
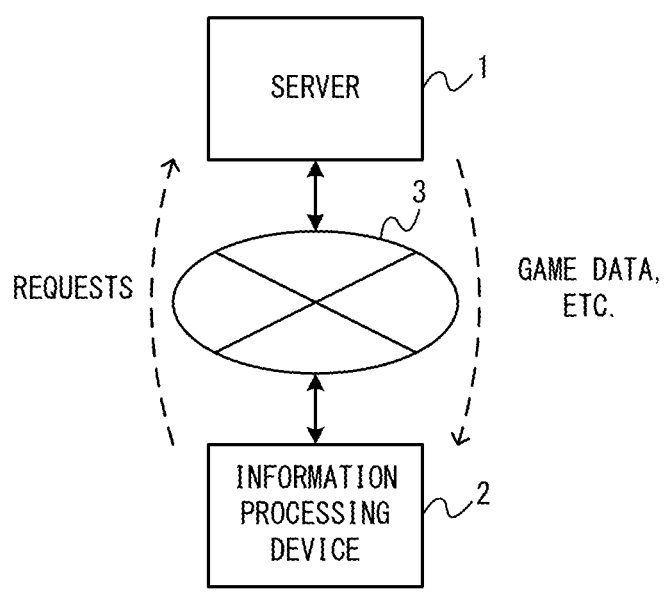
FIG. 1 is a block diagram showing an example configuration of a non-limiting information processing system according to the present embodiment.

An information processing system, an information processing device, a game program, and game processing method according to the present embodiment will be described. First, a general configuration of an information processing system according to the present embodiment, and a configuration of a terminal device and a server included in the information processing system will be described. FIG. 1 is a block diagram showing an example configuration of an information processing system of the present embodiment. As shown in FIG. 1, the information processing system includes a server 1 and an information processing device 2. The server 1 and the information processing device 2 can be connected to a network 3 such as the Internet and/or a mobile communication network. The server 1 and the information processing device 2 can communicate with each other via the network 3.

The server 1 is a server that provides service related to an application (specifically, game application) executed on the information processing device 2. In the present embodiment, the server 1 is a game server configured to execute a game on the information processing device 2. That is, the server 1 provides an environment for executing a game process on the information processing device 2. For example, in response to a request from the information processing device 2 executing a game process, the server 1 executes a game process as necessary and transmits game data to the information processing device 2 in response to the request.

The information processing device 2 is an example of an information processing device of a user, and the terminal device 2 may be a smartphone, a portable type or home-console type game device, a mobile phone, a tablet terminal, a wearable terminal, or the like, for example. The information processing device 2 is capable of executing a game program (in other words, a game application) for a game of which service is provided by the server 1.

(Specific Example of Configuration of Server 1)

Figure 2:
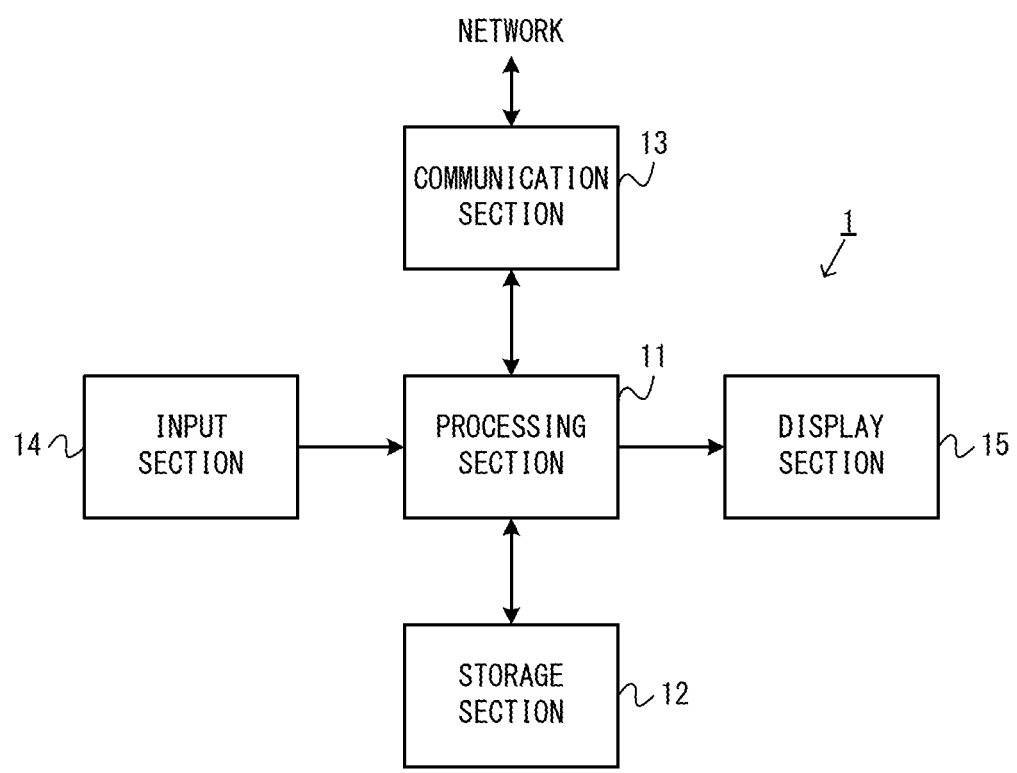
FIG. 2 is a block diagram showing an example configuration of a non-limiting server 1.

FIG. 2 is a block diagram showing an example configuration of the server 1. Various elements of the server 1 shown in FIG. 2 are implemented by one or more information processing devices. Herein, a "server" as used in the present specification refers to a single information processing device (i.e., a server device), and when the functions of the server are implemented by a plurality of server devices, it also refers to a whole server device group (i.e., a server system). Thus, a "server" may be a server device or may be a server system. Note that when a plurality of information processing devices are included in a server system, the information processing devices may be arranged at the same location or at different locations. Note that the hardware configuration of the server 1 of the present embodiment may be similar to those of conventional servers.

As shown in FIG. 2, the server 1 includes a processing section 11 and a storage section 12. The processing section 11 is electrically connected to various sections 12 to 15 of the server 1. The processing section 11 includes a CPU (Central Processing Unit) and a memory. In the server 1, the CPU executes various information processes by executing programs stored in the storage section 12 using the memory. The storage section 12 may be any storage device (referred to also as a "storage medium") that can be accessed by the processing section 11. The storage section 12 stores programs to be executed by the processing section 11, data to be used in information processes by the processing section 11, and data obtained by the information processes, etc. In the present embodiment, the storage section 12 at least stores programs for game processes executed on the server side for game processes executed on the information processing device 2.

The server 1 includes a communication section 13. The communication section 13 has the function of connecting to the network 3 and communicating with another device (e.g., the information processing device 2) via the network 3. The server 1 includes an input section 14 and a display section 15 as input/output interfaces.

(Specific Example of Configuration of Information Processing Device 2)

Figure 3:
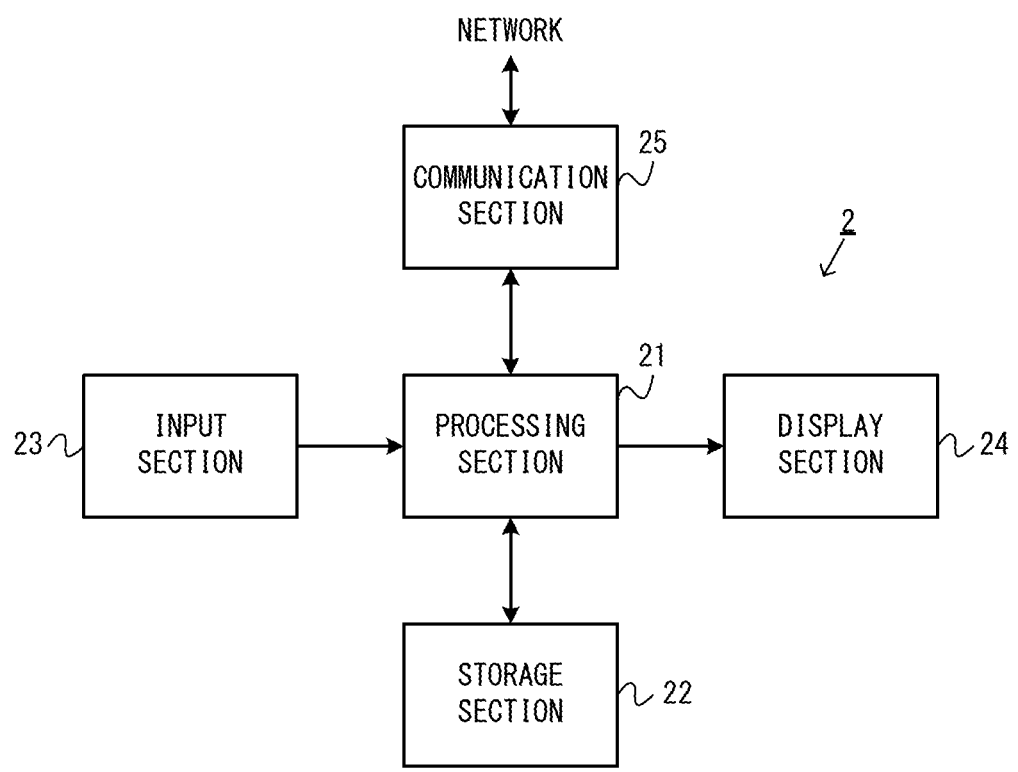
FIG. 3 is a block diagram showing an example configuration of a non-limiting information processing device.

FIG. 3 is a block diagram showing an example configuration of the information processing device 2. As shown in FIG. 3, the information processing device 2 includes a processing section 21 and a storage section 22. The processing section 21 is electrically connected to the various sections 22 to 25 of the information processing device 2. The processing section 21 includes a CPU and a memory. In the information processing device 2, the CPU executes various information processes by executing programs (including the game program described above) stored in the storage section 22 using the memory. The storage section 22 stores programs to be executed by the processing section 21, data to be used in information processes by the processing section 21, and data obtained by the information processes, etc. Note that the storage section 22 may be a storage medium provided in the information processing device 2, or a storage medium (e.g., a card-shaped storage medium) that can be attached to/detached from the information processing device 2.

The information processing device 2 includes an input section 23. The input section 23 may be any input device configured to accept an input from the user. In the present embodiment, the input section 23 includes a touch panel provided on the screen of a display section 24 to be described later. Note that the input section 23 may include a button and/or inertia sensor (e.g., an acceleration sensor or a gyrosensor), etc., in addition to (or instead of) the touch panel.

The information processing device 2 includes a display section 24. The display section 24 displays an image (e.g., a game image, etc.) generated by information processes executed by the processing section 21 of the information processing device 2.

The information processing device 2 includes a communication section 25. In the present embodiment, a communication section 25 has the function of connecting to a mobile communication network (in other words, a mobile phone communication network) for communication. That is, the information processing device 2 (specifically, the processing section 21) communicates with another device (e.g., the server 1, etc.) by connecting to the network 3 via a mobile communication network using the communication section 25 (in other words, via the communication section 25). Note that any configuration of the communication section may be used for the information processing device 2 to communicate via the network 3. For example, the communication section 25 may have the function of connecting to a wireless LAN by means of a Wi-Fi-certified communication module, or may have both the function of connecting to a mobile communication network and the function of connecting to a wireless LAN.

2. Outline of Operation of Information Processing System

The outline of processes to be executed on an information processing system of the present embodiment will now be described. According to the present embodiment, in a game application executed on the information processing device 2, the user plays the game in a continuous play mode. The continuous play mode is a game mode in which the user continuously plays a series of (e.g., 10) game stages (hereinafter referred to simply as "stages") in a single game play, the details of which will be described later. The game processes relating to the continuous play mode to be executed on the information processing system will mainly be described below.

[2-1. Outline of Game]

Figure 4:
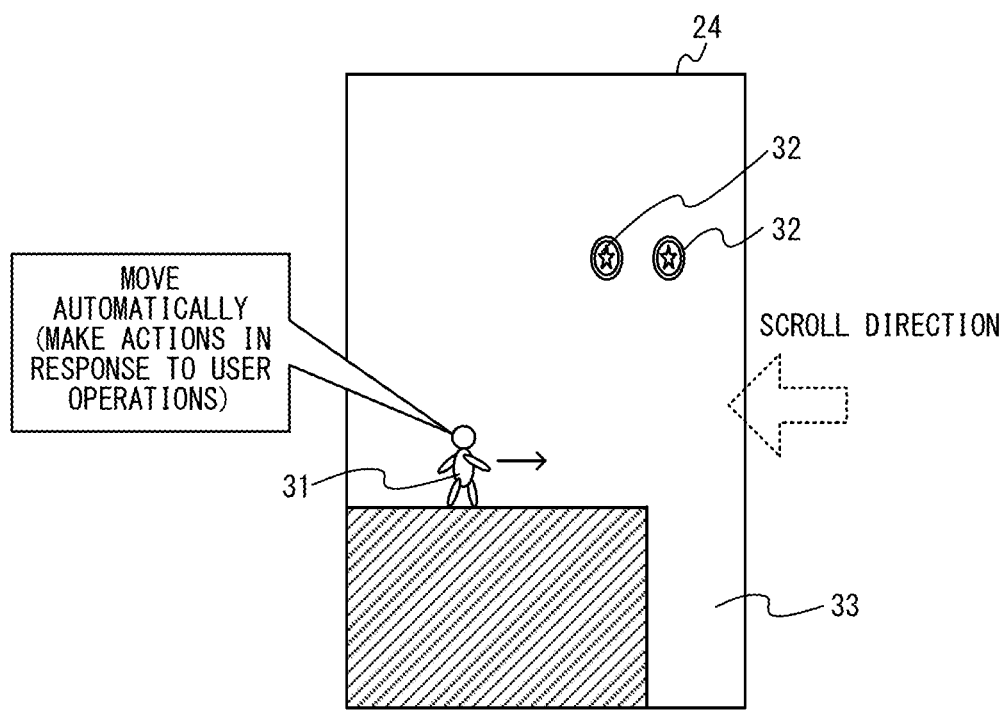
FIG. 4 is a diagram showing an example of a non-limiting game image displayed during a game play.

First, referring to FIG. 4, the outline of the game according to the present embodiment will be described. FIG. 4 is a diagram showing an example of a game image displayed during a game play. In the present embodiment, a game image as shown in FIG. 4, for example, is displayed on the display section 24 of the information processing device 2. The game of the game application of the present embodiment is an action game in which a player object 31 is controlled. Note however that in other embodiments, the game may be of any genre, e.g., an action game, a race game, a battle game, a simulation game or a puzzle game.

In the present embodiment, the information processing device 2 controls the player object 31 so as to automatically move in a predetermined direction (in the right direction in FIG. 4). That is, when a game play starts, the player object 31 moves in the predetermined direction even if there is no control by the user. The information processing device 2 scrolls a range of a game space (in other words, a game field; hereinafter referred to simply as a "field") that is displayed on the display section 24 in sync with the movement of the player object 31. That is, in sync with the player object 31 moving to the right, the image in the display range scrolls from right to left. Thus, a side-scrolling game is described as an example in the present embodiment, but the scrolling direction of the game may be the vertical direction or the depth direction of the screen. The scrolling direction of the game may change during a game play (e.g., between stages). In other embodiments, the game image may not scroll.

In the present embodiment, the user controls the player object 31 to perform a jump action, or the like, by using a predetermined operation (e.g., an operation of touching the screen of the display section 24). In the present embodiment, the objective of the game is to move the player object 31 to the goal by controlling the player object 31 without falling in gaps in the field (e.g., a gap 33 shown in FIG. 4) or hitting enemy objects (not shown).

Note that as shown in FIG. 4, coins 32 are arranged in the field, and the player object 31 can collect the coins during a game play. In the present embodiment, two types of coins, i.e., first coins and second coins, are arranged in the field, and the player object 31 can collect the two types of coins.

When a game play is started at one stage in the continuous play mode, the user tries to reach the goal by controlling the player object 31 through the field of the stage. When the player object 31 reaches the goal, it means that the user has cleared the stage. On the other hand, when the player object 31 falls in a gap or hits an enemy object, it means that the user has failed to clear the stage.

Note that in other embodiments, the condition for clearing a stage (referred to as the "clearing condition") may be any condition for each stage, e.g., defeating a particular enemy object, or collecting a particular item. In the present embodiment, the same clearing condition is used for all stages. That is, the field of each stage has a goal therein. Note that in other embodiments, the clearing condition may vary for every stage.

In other embodiments, the condition for the determination that the user has failed to clear the stage (referred to as the "failing condition") may be any condition, e.g., the hit points of the player object becoming zero, or a predetermined time limit expiring to zero.

[2-2. Outline of Continuous Play Mode]

Figure 5:
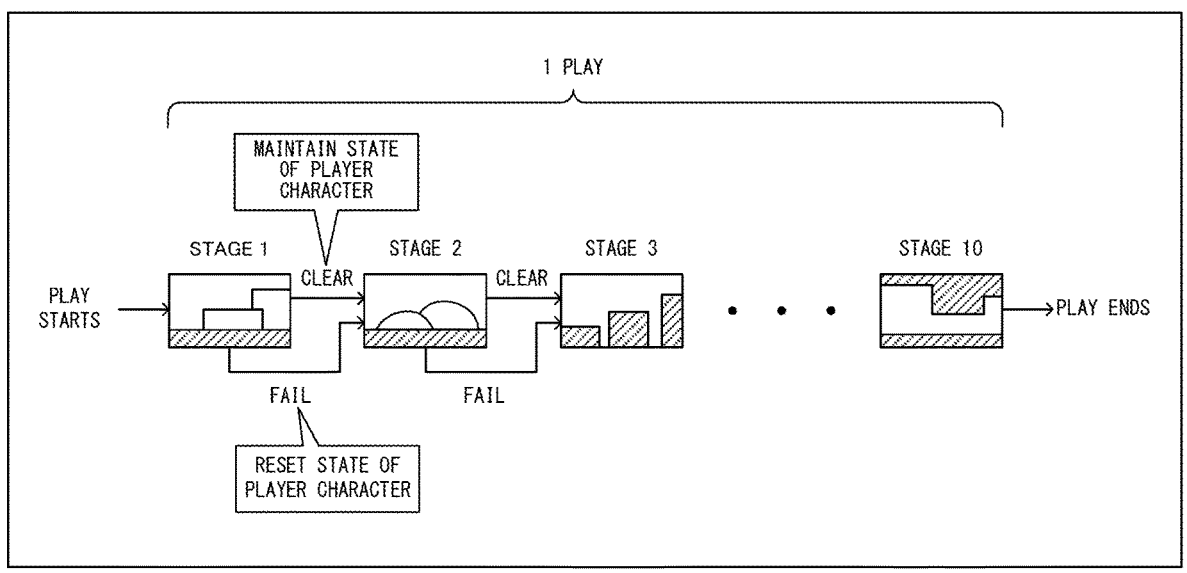
FIG. 5 is a diagram showing an example of a non-limiting game progression in a continuous play mode.
Figure 6:
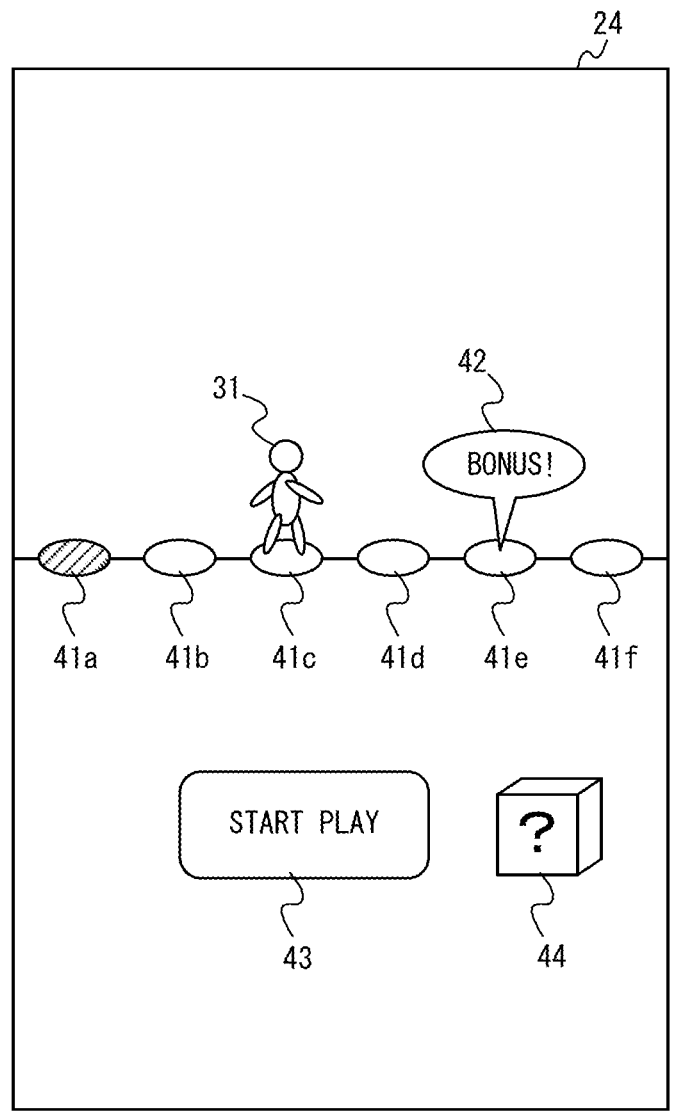
FIG. 6 is a diagram showing an example of a non-limiting area image in a continuous play mode.

Referring to FIG. 5 and FIG. 6, the continuous play mode will be outlined. FIG. 5 is a diagram showing an example of game progression in the continuous play mode. As shown in FIG. 5, in the continuous play mode, when a game play is started, the user successively plays 10 stages (stage 1 to stage 10 in FIG. 5). Thus, in the continuous play mode, the game is played by the unit of 10 stages.

As shown in FIG. 5, in the continuous play mode, when the current stage is cleared, the next stage is started. In the present embodiment, when the current stage is cleared, the information processing device 2 automatically starts the game play of the next stage. That is, the game play of the next stage is started even if the user does not give an instruction (e.g., an instruction to select a stage to be played next, or an instruction to start the next stage). Specifically, in the present embodiment, when the player object 31 reaches the goal in the current stage, the player object 31 is placed at the start point in the field of the next stage. Then, the game play of the next stage is started (that is, the movement of the player object 31 is started).

Herein, in the present embodiment, the player object 31 can take a plurality of states. Specifically, the player object 31 can take a normal state and an enlarged state. For example, the player object 31 transitions from the normal state to the enlarged state on the condition that a predetermined item is collected. Note that when the player object 31 in the enlarged state hits an enemy object, the player object 31 returns to the normal state, instead of resulting in a failure to clear the stage. On the other hand, when the player object 31 in the normal state hits an enemy object, it results in a failure to clear the stage. Moreover, in the present embodiment, the player object 31 can take an invincible state (in which the player object 31 can hit and defeat enemy objects without resulting in a failure to clear the stage or returning to the normal state) for a certain amount of time.

As shown in FIG. 5, in the present embodiment, when the current stage is cleared and the next stage is started, the state of the player object 31 is maintained. For example, when the player object 31 is in the enlarged state at the time of clearing the current stage, the player object 31 is in the enlarged state at the start of the next stage. Similarly, when the player object 31 is in the invincible state at the time of clearing the current stage, the player object 31 is in the invincible state at the start of the next stage. Note that in the present embodiment, the length of time over which the player object 31 can be in the invincible state is predetermined. When the current stage is cleared and the next stage is started, the invincible state is maintained, and the remaining amount of time for the invincible state of the player object 31 is also maintained. For example, if the remaining amount of time is 3 seconds at the time of clearing the current stage, the player object 31 will be in the invincible state for 3 seconds at the start of the next stage.

Note that in other embodiments, there is no limitation on the states of the player object 31 that are maintained when the current stage is cleared and the next stage is started. For example, in other embodiments, parameters of the player object 31 such as the hit points may be maintained, and the items owned by the player object 31 may be maintained.

As shown in FIG. 5, in the present embodiment, when the current stage is not cleared (i.e., when the user fails to clear the stage), the information processing device 2 automatically starts the next stage, as if the current stage were cleared. Thus, in the present embodiment, the game will never be over before the end of a series of stages (in other words, the game play will not be ended midway through the series of 10 stages), and the user is allowed to play the 10 stages even if the user fails to clear one or more of the stages.

As shown in FIG. 5, in the present embodiment, when the current stage is not cleared and the next stage is started, the state of the player object 31 is initialized. That is, at the start of the next stage, the player object 31 is set in the initial state (i.e., the normal state described above). Note that in other embodiments, the initial state may be a state in which the player object has maximum hit points, or may be a state in which the player object has an item or items that the player object initially owned at the start of the game.

In the present embodiment, a single game play ends when 10 stages are have been played (i.e., when the user clears or fails to clear the $10^{th}$ stage) (see FIG. 5). In the present embodiment, when the single game play ends, the information processing system allows the user to take a draw for an item (this will be referred to as the "first draw", as distinguished from the second draw to be described later). Then, the information processing device 2 displays an area image to be described later on the display section 24. While the area image is displayed, the user can start the game play under certain conditions, the details of which will be described later.

Note that in other embodiments, the information processing system may end the single game play when the 10 stages have been cleared, as opposed to when the 10 stages have been played. That is, the information processing system may end the process of the single game play on the condition that a predetermined number of stages have been either cleared or not cleared by the user, as in the present embodiment, or on the condition that a predetermined number of stages have been cleared by the user.

In the present embodiment, the information processing device 2 plays a single BGM during a single game play (in other words, over the course of 10 stages). Thus, the user is made to clearly recognize the game play of the series of 10 stages as a single game play. It is also possible to make the user feel that the stages are played uninterruptedly. Note that when the game play of the current stage is finished and the game play of the next stage is started, the information processing device 2 plays the BGM continuously. That is, instead of playing the BGM from the start of the tune at the start of the next stage, the BGM is played continuously over the transition between when the game image of the previous stage is displayed and when the game image of the next stage is displayed. Thus, the user is made to clearly recognize the game play of the 10 stages as a single game play.

As described above, according to the present embodiment, the user can continuously play a plurality of (specifically, 10) stages in a single game play. That is, at the end of the current stage, the next stage starts automatically, and the user can play the game uninterruptedly. Since the user can play a plurality of stages in a single game play, the information processing system can provide a game that is unlikely to be monotonous or boring. In the present embodiment, even if the user fails to clear one of a plurality of stages, the user can still play the next stage. Therefore, even beginners who are not used to playing video games can enjoy playing a plurality of stages.

Note that in the present embodiment, even if the user fails to clear the current stage, the user is basically allowed to play the next stage as described above. For a particular stage, however, the user may be allowed to play the next stage on the condition that the user clears that particular stage. For example, in other embodiments, the user may be required to clear the last stage of one area (described later) before the user is allowed to proceed to the next stage (in other words, the next area).

According to the present embodiment, in response to the determination that the user has cleared the current stage, the information processing device 2 starts the game process for the next stage following the current stage that the user has cleared while maintaining the state of the player object at the time of clearing the current stage. On the other hand, in response to the determination that the user has failed to clear the current stage, the information processing device 2 starts the game process for the next stage following the current stage that the user has failed to clear while resetting the state of the player object to the initial state. Thus, the play state (specifically, the state of the player object 31) for the next stage is varied between when the user has cleared the current stage and when the user has failed to clear the current stage, thereby motivating the user to play so as not to fail to clear the current stage. Therefore, it is possible to avoid detracting from the playability of the game in an embodiment where the user can still play the next stage even if the user fails to clear the current stage as in the present embodiment.

Note that in other embodiments, there is no limitation on the state of the player object 31 at the start of the next stage after failing to clear the current stage. For example, the next stage may be started while maintaining the state of the player object 31 as if the current stage were cleared. For example, when the next stage is started after the user fails to clear the current stage, the state of the player object 31 may be changed to a state that is different from the initial state. Specifically, the game play may be started with the player object 31 being in the invincible state at the start of the next stage. When the next stage is started after the user fails to clear the current stage, the player object 31 may be placed at a start position in the next stage that is different from the start position that would be used if the user cleared the current stage.

FIG. 6 is a diagram showing an example of an area image in the continuous play mode. In the present embodiment, when the continuous play mode is started, first, an area image is displayed on the display section 24. Here, in the present embodiment, in the continuous play mode, an area is defined to include a series of a predetermined number of stages. The area image is an image representing the user's progression through the stages of the area (i.e., how many of the predetermined number of stages of the area have been played).

As shown in FIG. 6, the area image includes stage icons 41a to 41f each representing a stage, and the player object 31. In the present embodiment, one area includes the predetermined number of stages. The predetermined number, which may vary from one area to another, is a number that is greater than the number of stages (herein, 10) to be played in a single game play, and more specifically is a number that is a multiple (e.g., 30) of the number of stages to be played in a single game play. The user successively plays the predetermined number of stages in the current area, and the user clears the area when the user clears the last one of the predetermined number of stages. In response to clearing each area, the information processing system may give the user an award (e.g., an award relating to the game; specifically, a character and/or item, etc., that can be used in the game).

As shown in FIG. 6, the stage icons of the area image are arranged in the order they are played and are connected together. The player object 31 is placed on the stage icon representing the current stage (the stage icon 41c in the example of FIG. 6). Note that the current stage refers to the stage that the user has played (cleared or failed to clear) last. In the example shown in FIG. 6, the display area includes stages of the area, including the current stage. The information processing device 2 may display the area image by scrolling the display area in response to the user's scroll operation.

In the present embodiment, when the user has played 10 stages in a single game play, the position of the player object 31 is moved forward in the area image in accordance with the number of stages (i.e., 10) that the user has played. Note that in other embodiments, the position of the player object 31 may be moved forward in the area image in accordance with the number of stages that the user has cleared, from among all the stages that the user has played in a single game play.

In the example of the area image shown in FIG. 6, the stage icons 41a and 41b on the left side of the stage icon 41c, representing the current stage, represent those stages that the user has already played. In the present embodiment, each of the stage icons 41a and 41b representing the played stages indicates the play result of the stage. Specifically, each of the stage icons 41a and 41b indicates whether or not the stage has been cleared by being displayed in different colors depending on whether the stage has been cleared. Note that in other embodiments, the stage icon may indicate another play result in addition to (or instead of) indicating whether or not the stage has been cleared. For example, the stage icon may indicate the result of collecting a predetermined item (e.g., coins) arranged in the stage (specifically, the number of coins collected, or whether all of the coins have been collected).

In the example of the area image shown in FIG. 6, the stage icons 41d to 41f on the right side of the stage icon 41c, representing the current stage, represent those stages that the user has not been played (referred to as "unplayed stages"). Here, in the present embodiment, the content (i.e., the field) of an unplayed stage is determined after the game play of the stage is started, as a general rule, the details of which will be described later. Note however that for a stage with which particular conditions are met, the field of the stage may be predetermined. For example, the information processing system may set a field of a bonus stage for a predetermined stage. The information processing system may set a field in which a particular enemy object (e.g., a boss character) appears for the last stage of an area.

In the present embodiment, the area image includes a mark image for a field whose content is predetermined as described above, where the mark image represents the content. In the example of the area image shown in FIG. 6, a mark image 42 representing a bonus stage is displayed while being associated with the stage icon 41e. The mark image 42 indicates that the stage represented by the stage icon 41e is a bonus stage. Note that the mark image may represent any content of the stage with which the mark image is associated. For example, the mark image may represent an enemy object appearing in the stage, or a player object to be controlled by the user in the stage.

As shown in FIG. 6, the area image includes a start button image 43. The start button image 43 is an image for accepting a play start instruction for starting a game play. That is, when a touch input is made on the start button image 43, the information processing device 2 starts a single game play in the continuous play mode.

In the present embodiment, as a general rule, after a single game play in the continuous play mode is done, the user is not allowed to start a new game play until a predetermined amount of time elapses since the end of the last game play. Note that the user may be allowed to cut down the remaining amount of time of wait (the wait is set to a predetermined amount of time) that needs to elapse before the next game play, or to start the next game play with no wait by consuming a predetermined item (e.g., a ticket that can be purchased for a charge). The predetermined amount of time may be set to be longer as the game progresses in the continuous play mode (specifically, longer for later areas and/or later stages). Thus, the information processing system may set conditions relating to a game play in the continuous play mode.

As shown in FIG. 6, the area image includes a draw image 44. The draw image 44 is an image for accepting a draw instruction to take a second draw (which is different from the first draw described above). That is, when a touch input is made on the draw image 44, the information processing device 2 starts a second draw. Here, the information processing system allows for a second draw depending on the number of second coins owned by the user, which can be collected by the player object 31 during a game play in the continuous play mode. In the present embodiment, the user can take a second draw on the condition that a predetermined number of second coins are consumed. That is, each time a second draw is taken, a predetermined number of second coins are consumed from the user's collection of second coins.

As is a first draw, a second draw is for drawing an item to be awarded to the user. Note however that in the present embodiment, the first draw and the second draw are different from each other in terms of the type and/or number of items, and the probability of drawing an item or items. In the present embodiment, rarer items are more likely to be drawn with a second draw that is allowed on the condition that second coins are consumed, than with a first draw that is allowed for every game play. Note however that in other embodiments, the first draw and the second draw may be the same draw.

Note that in the present embodiment, with first coins, the number of coins collected in a single game play is calculated as the total number of first coins that have been collected through the 10 stages, irrespective of whether the stages have been cleared. On the other hand, with second coins, the number of coins collected in a single game play is calculated as the total number of second coins that have been collected in stages that have been cleared from among the 10 stages in a single game play. The number of coins collected can be said to be an example of a numerical value that represents the result of a single game play. In the present embodiment, with first coins, the information processing system can obtain a numerical value that represents the play result, irrespective of whether stages have been cleared, by calculating the sum of the numbers of first coins collected in the stages played in a single game play.

On the other hand, with second coins, the information processing system can obtain a numerical value that represents the play result, dependent on whether or not stages have been cleared, by calculating the sum of the numbers of second coins collected in the stages cleared in a single game play. By allowing a second draw based on the number of second coins collected, it is possible to avoid detracting from the playability of the game in the embodiment in which the user is allowed to play the next stage even if the user has failed to clear the current stage.

[2-3. Method for Setting Fields in Continuous Play Mode]

Figure 7:
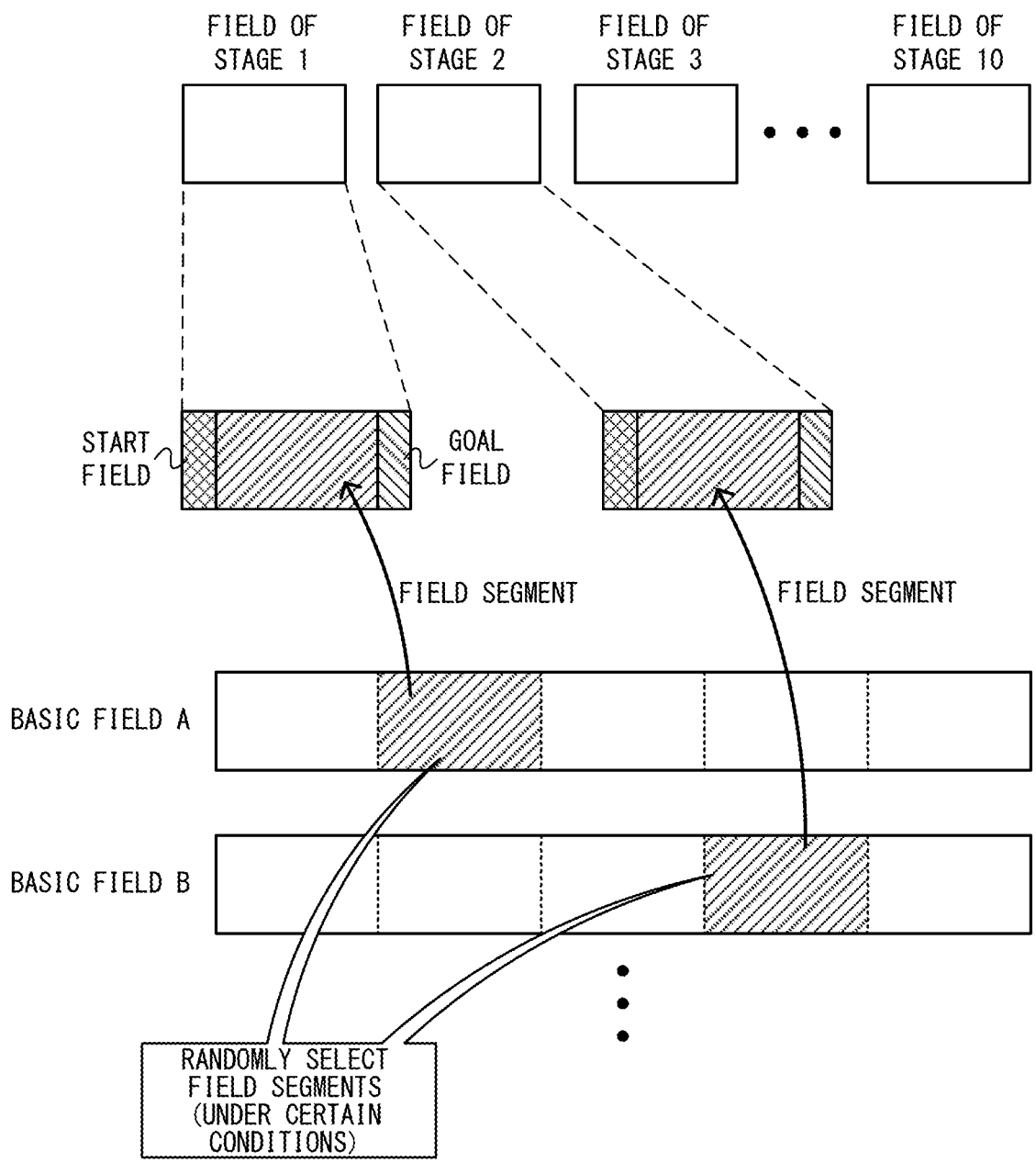
FIG. 7 is a diagram showing an example of a method for setting fields.
Figure 8:
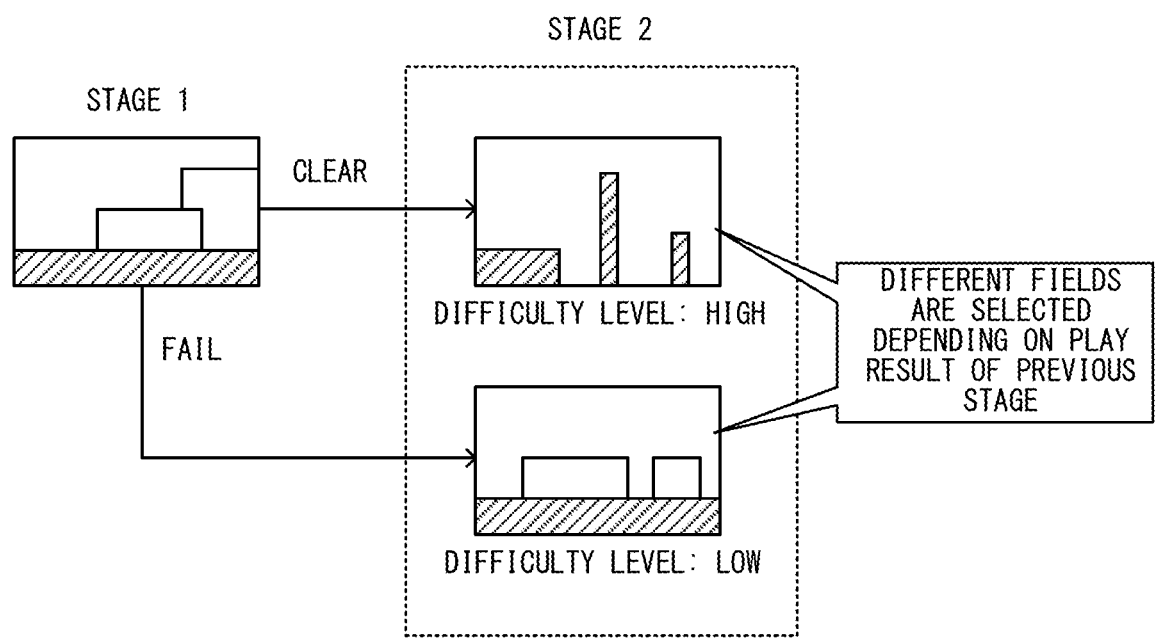
FIG. 8 is a diagram showing an example of a method for selecting a stage.

Referring to FIG. 7 and FIG. 8, a method for setting a field of a stage in a continuous play mode will be described. In the present embodiment, a field is a game space (referred to also as a "game course") including terrains and objects (e.g., enemy objects, items, etc.). Note however that a field may be any virtual space or a plane where the game is played. For example, in a puzzle game, it can be said that a field is a plane where puzzle objects are placed. In the present embodiment, the information processing system determines a field to be set for each stage in a single game play. Note that a field can be said to be a set of game elements (e.g., terrains and objects) to be arranged in a virtual space, and the information processing system can be said to produce a field in a virtual space.

FIG. 7 is a diagram showing an example of a method for setting a field. As shown in FIG. 7, in the present embodiment, a field of each stage in the continuous play mode is generated based on basic fields. Basic fields are fields that are provided in advance in the game program. In the present embodiment, the game can be played in another mode different from the continuous play mode, and the basic fields are fields that are used in the other mode. The "other mode" is a normal mode in which the user plays stages of predetermined fields in a predetermined order, for example.

In the present embodiment, a plurality of basic fields are provided in the information processing system (see FIG. 7). The plurality of basic fields are fields that are different from each other in terms of the arrangement of terrains and/or objects (e.g., the arrangement of coins and/or the arrangement of enemy objects).

As shown in FIG. 7, in the present embodiment, one basic field is divided into a plurality of segments. Hereinafter, the segments of each basic field are referred to as "field segments". When setting a field of a stage in the continuous play mode, one field segment is selected from among the field segments included in each basic field, and a field is set based on the selected field segment, the details of which will be described later.

Specifically, the information processing system first selects one of the field segments included in each basic field. In the example shown in FIG. 7, the second field segment of basic field A is selected as the field of stage 1, and the fourth field segment of basic field B is selected as the field of stage 2. Here, in the present embodiment, the information processing system selects one field segment from among the field segments included in each basic field with a degree of randomness. As used herein, "to select with a degree of randomness" does not mean to make selections randomly in a strict sense, but means to make selections based on probability in such a manner that the results will not be the same for the plurality of selections.

In the present embodiment, field segments are selected according to the following rules (a) to (h) and based on a predetermined probability (as opposed to selecting randomly in a strict sense).

(a) "the same field segment is unlikely to be selected consecutively": for a field segment that is selected for one stage, the probability of selection is set to be low for the next stage.

(b) "field segments of the same type are unlikely to be selected consecutively": in the present embodiment, field segments are classified into a plurality of types (e.g., overground fields, underground fields, etc.). When a certain field segment is selected for one stage, the probability for selecting a field segment of the same type as the certain field segment is set to be low for the next stage.

(c) "field segments from the same basic field are unlikely to be selected consecutively": when a certain field segment is selected for one stage, the probability for selecting a field segment included in the same basic field as the certain field segment is set to be low for the next stage.

(d) "field segments of the same terrain are unlikely to be selected consecutively": when a certain field segment is selected for one stage, the probability for selecting a field segment of the same terrain (i.e., with only the arrangement of objects being different) as the certain field segment is set to be low for the next stage.

With the rules (a) to (d) described above, the same or similar field segments are unlikely to be selected consecutively, and a set of stages for a single game play can be set so that the user is unlikely to be bored. Note that in other embodiments, a rule "an already-selected field segment is not selected until a predetermined set of field segments have all been selected" may be used, instead of the rule (a). With this rule, it is possible to reduce the possibility of a lopsided selection of field segments, and it is possible to provide the user with a wide variety of stages.

(e) "of the set of 10 stages for a single game play, field segments with lower difficulty levels are more likely to be selected for the first half (e.g., the first five stages), and field segments with higher difficulty levels are more likely to be selected for the latter half (e.g., the latter five stages)": note that in the present embodiment, it is assumed that a difficulty level is set for each field segment (the details of which will be described later). With the rule (e), it is easier to set a set of stages for a single game play in such an order that it is easy for the user to play.

(f) "only some of all the field segments are candidates for selection at first, and more field segments become candidates for selection through the satisfaction of predetermined conditions": the predetermined conditions may be those relating to the number of stages or areas cleared or those relating to the number of times the game has been played. With the rule (f), by playing more in the continuous play mode, the user will get to play more fields that the user could not play before. Therefore, the information processing system can motivate the user to repeatedly play in the continuous play mode.

(g) "for a particular stage, a predetermined field segment is fixedly selected or is more likely to be selected": with the rule (g), the intention of the game developer can be reflected in the selection of fields. For example, for the first stage of an area, a predetermined field segment (e.g., the first field segment of basic field A) may be always selected. For example, for the last stage of a single game play, a field segment of a basic field where the goal is arranged (e.g., the player object 31 is controlled to strike a predetermined pose upon reaching the goal). For example, for the last field of an area, a field segment with a particular enemy character may be selected. For example, a field segment of a particularly high difficulty level may be selected at a predetermined rate (e.g., at a rate of once in 50 stages). Note that since the user is allowed to proceed to the next stage even when the user fails to clear the current stage in the present embodiment, even if such a field of a high difficulty level is selected, it is possible to provide the user with a wide variety of stages so as not to bore the user, without imposing an undue load on the user.

(h) "different field segments are selected depending on the play result for the previous stage (specifically, whether or not the previous stage has been cleared)": with the rule (h), it is possible to reduce the possibility for the user to successively fail to clear a stage, and it is possible to reduce the possibility that the user loses motivation to play midway through a single game play. The details of the rule (h) will be described later (see FIG. 8).

Note that in other embodiments, there is no limitation on the specific method for selecting a field segment. Some or all of the rules (a) to (h) described above may not be used, or other rules may be used in addition to the rules (a) to (h) described above.

When a field segment is selected, the information processing system generates a stage field (in other words, a field to be used for the stage) based on the field segment. In the present embodiment, as shown in FIG. 7, the information processing system generates a stage field by combining a start field and a goal field with the selected field segment. A start field is a field that includes the position at which the player object 31 starts. A goal field is a field that includes the position to be the goal of the stage. For example, a goal field includes a door or a pipe leading to the next stage, or a pole representing the goal. A start field and a goal field are merely for setting the start position and the goal position, and are very short fields. That is, a start field and a goal field are fields that are shorter than a field segment.

There may be a plurality of types of start fields and goal fields. In such a case, from among a plurality of types of start fields and goal fields, the information processing system may select a start field and a goal field that are suitable for the selected field segment (e.g., of the same type as the selected field segment). For example, when the selected field segment represents an underground terrain, a start field and a goal field that represent an underground terrain may be selected. The information processing system may select a start field and a goal field with a degree of randomness.

In other embodiments, the information processing system may generate a stage field by combining only one of a start field and a goal field with the field segment, or may use the field segment, as it is, as a stage field without combining it with a start field and a goal field.

Note that in the present embodiment, the information processing system uses the selected field segment as it is (i.e., without making a change to the field segment). That is, the information processing system combines the selected field segment as it is with a start field and a goal field. Note however that in other embodiments, the information processing system may make a change to the selected field segment. For example, a change may be made to the field segment so as to make a smooth connection between a start field and the field segment. For example, an addition and/or a change may be made to the arrangement of objects in the field segment. More specifically, a change may be made to add objects for the continuous play mode to the field segment. Note that objects for the continuous play mode are those that do not appear in the normal mode but appear in the continuous play mode (e.g., second coins described above). In other embodiments, fields obtained by making changes to field segments (in other words, fields for the continuous play mode) may be provided in advance. In other embodiments, the information processing system may generate a field for the continuous play mode automatically, but not based on a basic field.

Note that as described above, in the present embodiment, the user needs to clear the last stage of an area in order to proceed to the next stage (in other words, the next area). That is, in a game play of 10 stages that include the last stage of the area, when the last stage is not cleared, the information processing system makes the user play the same 10 stages again in the following game play. In such a case, the information processing system may re-select fields for the 10 stages. Moreover, in this process, fields of lower difficulty levels than the fields selected for the previous game play may be selected (or may be more likely to be selected). Note that the method for selecting fields of lower difficulty levels (or making them more likely to be selected) will be described later. In other embodiments, when the last stage is not cleared, the information processing system may select, for the following game play, the same fields as those selected for the previous game play.

As described above, in the present embodiment, the information processing system selects at least one of a plurality of basic fields (more specifically, field segments) provided so as to generate a field of each stage using the selected basic field. Then, the field of each stage in the continuous play mode is selected from among field segments of basic fields with a degree of randomness, and it is possible to set the field of each stage so as not to bore the user.

Note that in the present embodiment, the information processing system selects one field for each of the 10 stages of a single game play. Here, in other embodiments, there is no limitation on the method for selecting each field with a degree of randomness. For example, in other embodiments, there may be provided a plurality of sets each including 10 fields, and the information processing system may select one of the plurality of sets with a degree of randomness. Moreover, in this process, the information processing system may generate a field of each of the 10 stages in a single game play at a point in time before the start of the stage, or may generate fields for the 10 stages at once at a point in time before the start of the first stage in the game play.

Figure 10:
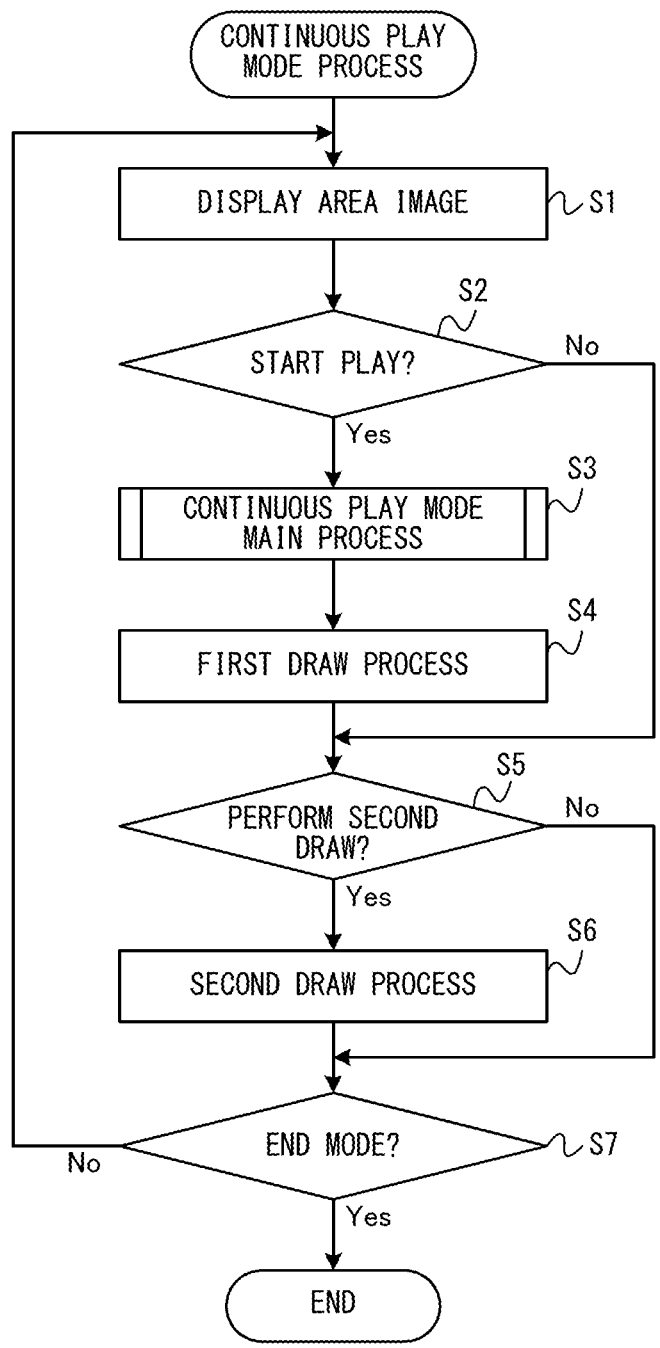
FIG. 10 is a flow chart showing a flow of an example of an information process executed by a non-limiting information processing device.

In the present embodiment, the process of selecting a field and the process of generating a field are executed by the information processing device 2 (see FIG. 9 and FIG. 10). Note that in other embodiments, the process of selecting a field and the process of generating a field may be executed on the server 1. Then, the information processing device 2 does not need to store data that are used for generating fields (i.e., data of basic fields, and data of start fields and goal fields).

In the present embodiment, a field of each stage in the continuous play mode is generated based on a basic field used in another mode (specifically, the normal mode described above). Therefore, it is possible to present, to the user who plays the game in the continuous play mode, the content of the basic field. For example, the user may possibly be allowed to play, in the continuous play mode, a field that the user has not yet played in the other mode. Thus, it is possible to motivate the user to play in the other mode. On the other hand, in the present embodiment, fields that have been played in the other mode may also appear. Therefore, it is possible to reduce the possibility that all the stages in a single game play are those that the user has not seen before. Thus, the user can play the game in the continuous play mode while making use of his/her experience of playing in the other mode, and it is possible to reduce the possibility that the game in the continuous play mode is too difficult. Moreover, when a field that the user has played before in the other mode appears in the continuous play mode, the user is reminded of the field, thereby motivating the user to play the game again in the other mode in which the field appears. That is, the continuous play mode can motivate the user to play the game in the other mode for additional challenges (or to "master" the game in the other mode).

Moreover, by generating fields for stages in the continuous play mode based on basic fields used in the other mode, it is possible to reduce the amount of field-related data stored on the information processing system. It is also possible to easily generate a field for each stage in the continuous play mode. It is also possible to reduce the burden on the game developer.

In the present embodiment, the field of a stage in the continuous play mode is composed of a portion of a basic field. Therefore, the field of one stage in the continuous play mode is shorter than the basic field used in the other mode described above. Thus, in the continuous play mode, the user can experience one stage in a relatively short amount of time (i.e., an amount of time that is shorter than that for playing a basic field in the other mode). The user can successively play a plurality of short stages, and can therefore play many stages in a short amount of time.

In the present embodiment, a goal is set for each of the stages in a single game play. Thus, even though the user plays a plurality of stages in a single game play, the user can clearly recognize the start and the end of each stage, and the information processing system can clearly make the user feel like the user is playing a plurality of stages. Even when the user is successively playing a plurality of stages in a single game play, the user can feel the sense of achievement for each stage.

Next, referring to FIG. 8, the method for selecting the rule (h) described above will be described. FIG. 8 is a diagram showing an example of a method for selecting a stage. In the example shown in FIG. 8, when stage 1 is cleared, a field segment of a relatively high difficulty level (i.e., as compared with a case in which stage 1 is not cleared) is selected for stage 2, and the field of stage 2 is generated by using a field segment of a higher difficulty level. On the other hand, when stage 1 is not cleared, a field of a relatively low difficulty level (i.e., as compared with a case in which stage 1 is cleared) is selected for stage 2, and the field of stage 2 is generated by using a field segment of a lower difficulty level.

Specifically, the information processing system sets a field of a stage at a predetermined point in time before the start of the stage in a single game play. The predetermined point in time is a point in time after the start of the game play for the first stage in the single game play, and is a point in time after the end of the previous stage for the second or subsequent stage in the single game play.

At the predetermined point in time, the information processing system selects a field segment to be used for the current stage based on the play result for the previous stage. Note that for the first stage of a single game play, the "previous stage" refers to the last stage of the previous game play. Here, in the present embodiment, the difficulty level is set for each basic field (in other embodiments, it may be set for each field segment). When the previous stage has been cleared, the information processing system selects a field segment from a basic field whose difficulty level is greater than or equal to a predetermined level. On the other hand, When the previous stage has not been cleared, the information processing system selects a field segment from a basic field whose difficulty level is lower than the predetermined level.

In other embodiments, a field segment may be selected with a degree of randomness so that a field segment of a higher difficulty level is likely to be selected when the previous stage has been cleared and a field segment of a lower difficulty level is likely to be selected when the previous stage has not been cleared.

As described above, in the present embodiment, the game field generated by the information processing system for the next stage is varied between when it is determined that the user has cleared the current stage and when it is determined that the user has failed to clear the current stage. Thus, the information processing system can appropriately determine the field of the next stage depending on whether or not the previous stage has been cleared. For example, in the present embodiment, when the user has failed to clear the current stage, the difficulty level of the next stage is likely to be lower so that the user is more likely to clear the next stage. Thus, it is possible to reduce the possibility for the user to successively fail to clear a stage, and it is possible to reduce the possibility that the user loses motivation to play midway through a single game play.

It can also be said that in the present embodiment, the information processing system determines the field for the next stage depending on the user's play result for the previous stage. Therefore, the information processing system can appropriately determine the field for the next stage depending on the play result for the previous stage. Note that the "play result for a stage" is not limited to whether or not the stage has been cleared. For example, in other embodiments, when there are multiple ways of clearing a stage, the information processing system may determine the field for the next stage depending on how the current stage is cleared. For example, where a plurality of goals are set in a stage, the field for the next stage may be determined depending on the goal that is reached by the player object 31. Specifically, when the player object 31 reaches a goal that is difficult to reach, the field for the next stage may be determined to be a special field (e.g., a field where many coins are arranged). Then, it is possible to further improve the playability of the game.

The information processing system may determine the field for the next stage depending on the play result for one or more stages that have been played. Note that "stages that have been played" refer to stages that have been played prior to the next stage. For example, the information processing system may make it more likely that a field of a higher difficulty level is selected (specifically, increase the probability that a field of a higher difficulty level is selected) each time the user clears a number of stages consecutively. For example, the information processing system may determine the fields of the stages to be played in the next game play depending on the play result for the 10 stages in the previous game play.

Note that the "play result for a stage" may be any result from a game play. For example, it may be the number of items (e.g., coins) collected in the stage, may be the number of enemy objects defeated by the player object 31 in the stage, may be the amount of time taken to clear the stage, or may be the score marked in the stage.

Note that in other embodiments, there is no limitation on the method for setting 10 stages in a single game play. For example, in other embodiments, the information processing system may set fields of the 10 stages at a point in time before the start of the first stage in a single game play. That is, the field segments to be used in the 10 stages may be selected at the point in time, and the fields of the stages may be generated based on the selected field segments at the point in time. In this process, the information processing system may set the fields by a method of selecting a field segment for each stage, or may set the fields by a method of first selecting 10 field segments and then determining stages using the selected 10 field segments (in other words, determining the order in which the field segments are used). The information processing system may select 10 field segments to be used in 10 stages at a point in time before the start of the first stage in a single game play and, at a point in time before the start of each stage, generate a field for the stage by determining one of the selected 10 field segments that is to be used in the stage.

3. Specific Example of Process on Information Processing System

Referring to FIG. 9 to FIG. 11, a specific example of how the information process that has been outlined above is executed on the information processing system will be described.

[3-1. Data Used in Process]

Referring to FIG. 9, a specific example of data used in an information process by the information processing system will be described. FIG. 9 is a diagram showing an example of data used in an information process by the information processing system. The data shown in FIG. 9 is stored in a storage device of the information processing device 2 (specifically, a memory of the processing section 21 and/or the storage section 22).

As shown in FIG. 9, the information processing device 2 stores a game program. In the present embodiment, the CPU (in other words, the processor) of the processing section 21 executes the game program, thereby executing a game process (FIG. 10 and FIG. 11) to be described below.

The information processing device 2 stores basic field data and partial field data. The basic field data is data used for generating the basic fields described above. The basic field data includes data used for generating the basic field for each field segment described above. The partial field data is data used for generating the start field and the goal field described above. The basic field data and the partial field data may be included in the game program, and stored in the information processing device 2 in advance (in other words, before the execution of the game process).

The information processing device 2 stores field data for the continuous play mode. In the present embodiment, the field data is generated in an information process to be described below. Note that the various field data (the basic field data, the partial field data and the field data for the continuous play mode) include data representing the terrain of the field, and data representing objects arranged in the field.

The information processing device 2 stores player object data. The player object data includes data representing the state of the player object 31. In the present embodiment, the player object data includes data indicating whether or not the player object 31 is in the enlarged state, and data indicating whether or not the player object 31 is in the invincible state.

The information processing device 2 includes selection method data representing the field selecting method. Specifically, for the process of selecting field segments, the selection method data indicates whether to use a method of selecting a field segment of a high difficulty level or to use a method of selecting a field segment of a low difficulty level based on the rule (h).

The information processing device 2 includes first coin data and second coin data. The first coin data represents the number of first coins collected by the player object 31. The second coin data represents the number of second coins collected by the player object 31.

[3-2. Example of Game Process]

FIG. 10 and FIG. 11 are flow charts showing the flow of an example of an information process to be executed on the information processing device 2. Note that the series of processes shown in FIG. 10 and FIG. 11 (referred to as the "continuous play mode process") is started in response to the selection of the continuous play mode after starting the game program stored in the storage section 22.

Note that in the present embodiment, it is assumed that the process steps shown in FIG. 10 and FIG. 11 are executed by the CPU (in other words, the processor) of the processing section 21 of the information processing device 2 executing a game program (specifically, the game program for the action game) stored in the storage section 22. Note however that in other embodiments, some of the process steps may be executed by a processor (e.g., a dedicated circuit, etc.) other than the CPU. The processes of the various steps shown in FIG. 10 and FIG. 11 are merely illustrative, and the order of steps may be switched around, or other processes may be performed in addition to (or instead of) these steps, as long as similar results are obtained.

In other embodiments, the process steps shown in FIG. 10 and FIG. 11 may be executed by a cooperation between the information processing device 2 and the server 1. That is, some of the process steps shown in FIG. 10 and FIG. 11 may be executed on the server 1. Then, the server 1 receives data to be used in the processes from the information processing device 2 via the network 3. The server 1 transmits data obtained as a result of the processes to the information processing device 2 via the network 3.

The processing section 21 of the information processing device executes the process steps shown in FIG. 10 and FIG. 11 by using a memory. That is, the CPU of the processing section 21 stores information (in other words, data) obtained by the process steps in a memory, and reads out the information from the memory as necessary to use the information in subsequent process steps.

In step S1 shown in FIG. 10, the processing section 21 displays the area image (FIG. 6) described above on the display section 24. For example, the processing section 21 sets a display range of the current area so that the player object 31 is included therein, and generates the area image in the display range that has been set and displays the generated area image on the display section 24. The process of step S2 is executed, following step S1.

In step S2, the processing section 21 determines whether or not to start a game play in the continuous play mode. That is, the processing section 21 obtains from the input section 23 information representing an input from the user so as to determine whether or not a touch input has been performed on the start button image 43 in the area image. Note that in the present embodiment, as described above, the next game play cannot be started, as a general rule, until a predetermined amount of time elapses since the end of the last game play. Therefore, when the remaining amount of time of the predetermined amount of time is not zero, the processing section 21 does not accept a touch input on the start button image 43 (in other words, an instruction to start a game play). If the determination result of step S2 is affirmative, the process of step S3 is executed. On the other hand, if the determination result of step S2 is negative, the process of step S5 to be described later is executed, skipping the processes of steps S3 and S4.

In step S3, the processing section 21 executes a continuous play mode main process. The continuous play mode main process is a process that is executed during a game play in the continuous play mode. Now, referring to FIG. 11, the details of the continuous play mode main process will be described.

In the continuous play mode main process, first, in step S11, the processing section 21 selects a field segment to be used in the next stage to be played. As a specific process, the processing section 21 reads out the selected field segment data from the basic field data stored in the storage section 22. The field segment is selected by the method described in "[2-3. Method for setting field in continuous play mode]" above. Here, regarding the rule (h) described above, the selection is made by a selection method represented by the selection method data stored in the memory, for example. The process of step S12 is executed following step S11.

In step S12, the processing section 21 generates a field based on the field segment selected in step S11. As a specific process, the processing section 21 generates a field using a start field and a goal field included in the partial field data stored in the storage section 22, and the field segment data read out in step S11. The processing section 21 stores data representing the generated field in the memory as field data for the continuous play mode. Note that the field is generated by the method described in "[2-3. Method for setting field in continuous play mode]" above. The process of step S13 is executed, following step S12.

In step S13, the processing section 21 executes a game control process. In the present embodiment, the game control process includes the following processes.

- Process of controlling the action of the player object 31 based on the player object data, etc.
- Process of controlling the action of objects other than the player object 31.
- Process of changing the state of the player object 31.
- Process of counting the number of coins collected by the player object 31.
- Process of scrolling display range.
- Process of using the field data to generate a game image representing a game space (in other words, a field) in the display range, and display the game image on the display section 24.

In the present embodiment, as a process of controlling the action of the player object 31, the processing section 21 executes the first process of moving the player object 31 in a predetermined direction in the game field, and the second process of controlling the action (e.g., a jump action) of the player object 31 in response to an operation by the user. The first process is a process of automatically advancing the game, independent of operations by the user. As a process of changing the state of the player object 31, the processing section 21 executes a process of changing the state of the player object 31 and updating the player object data stored in the memory in response to satisfaction of a predetermined condition. The process of step S14 is executed, following step S13.

In step S14, the processing section 21 determines whether or not the user has failed to clear the current stage. The determination is made by determining whether or not the player object 31 has fallen in a gap or hits an enemy object. The processing section 21 makes the determination based on data representing the position of the player object 31 and/or the position of the enemy object stored in the memory. If the determination result of step S14 is affirmative, the process of step S15 is executed. On the other hand, if the determination result of step S14 is negative, the process of step S19 to be described later is executed.

In step S15, the processing section 21 determines whether or not the 10 stages for the current game play have been played. For example, the processing section 21 counts the number of times the user has cleared or failed to clear a stage in the current game play, and determines whether or not the count has reached 10. If the determination result of step S15 is negative, the process of step S16 is executed. On the other hand, if the determination result of step S15 is affirmative, the process of step S24 to be described later is executed.

In step S16, the processing section 21 resets the state of the player object 31 (in other words, sets it to the initial state). That is, the processing section 21 stores, in the memory, player object data that represents the normal state (i.e., a state that is not the enlarged state or the invincible state). Thus, the player object 31 in the normal state will appear in the field to be played next. The process of step S17 is executed, following step S16.

In step S17, the processing section 21 sets the field selecting method relating to the rule (h) described above to a method of selecting a field segment of a low difficulty level. That is, the processing section 21 stores, in the memory, selection method data representing a method of selecting a field segment of a low difficulty level. Thus, in the process of selecting a field segment to be used in the field to be played next (step S11), a field segment of a low difficulty level will be selected. The process of step S18 is executed, following step S17.

In step S18, the processing section 21 adds the number of first coins collected by the player object 31 in the current stage to the number of first coins that have been collected in the current game play. Note that the number of first coins collected by the player object 31 in the current stage is counted in the game control process, and data representing the number of stored in the memory. The processing section 21 stores, in the memory, data representing the number of first coins after the addition as the first coin data. Thus, in the present embodiment, when the user fails to clear a stage, it is regarded that the user has only collected the first coins but not the second coins in the stage. The process of step S11 is executed again, following step S18.

On the other hand, in step S19, the processing section 21 determines whether or not the user has cleared the current stage. The determination is made by determining whether or not the player object 31 has reached the goal. The processing section 21 makes the determination based on data representing the position of the player object 31 stored in the memory. If the determination result of step S19 is affirmative, the process of step S20 is executed. On the other hand, if the determination result of step S19 is negative, the process of step S13 is executed again. Note that in the continuous play mode main process, a series of steps S13, S14 and S19 is executed repeatedly until the determination result of step S14 or S19 is affirmative.

In step S20, the processing section 21 determines whether or not the 10 stages for the current game play have been played. The determination process of step S20 is similar to the determination process of step S15. If the determination result of step S20 is negative, the process of step S21 is executed. On the other hand, if the determination result of step S20 is affirmative, the process of step S24 to be described later is executed.

In step S21, the processing section 21 stores the current state of the player object 31. That is, the processing section 21 stores, in the memory, the player object data representing the current state of the player object 31. Note that when such player object data is already stored in the memory, the process of step S21 may be skipped. Therefore, in the field to be played next, the player object 31 in the state at the time of clearing the previous field will appear. The process of step S22 is executed, following step S21.

In step S22, the processing section 21 sets the field selecting method relating to the rule (h) described above to a method of selecting a field segment of a high difficulty level. That is, the processing section 21 stores, in the memory, selection method data representing a method of selecting a field segment of a high difficulty level. Thus, in the process of selecting a field segment to be used in the field to be played next (step S11), a field segment of a high difficulty level will be selected. The process of step S23 is executed, following step S22.

In step S23, the processing section 21 adds the number of first coins collected by the player object 31 in the current stage to the number of first coins that have been collected in the current game play. The processing section 21 also adds the number of second coins collected by the player object 31 in the current stage to the number of second coins that have been collected in the current game play. Note that the number of second coins collected by the player object 31 in the current stage is counted in the game control process, and data representing the number of stored in the memory. The processing section 21 stores, in the memory, data representing the number of first coins after the addition as the first coin data, and data representing the number of second coins after the addition as the second coin data. Thus, in the present embodiment, when the user clears a stage, it is regarded that the user has both collected the first coins and collected the second coins in the stage. The process of step S11 is executed again, following step S23.

In step S24, the processing section 21 executes an end-of-play process. In the present embodiment, the process of displaying the play result and the save process are executed as the end-of-play process. In the process of displaying the play result, the processing section 21 displays, on the display section 24, a game image representing the results of the current game play (e.g., the number of stages cleared, the number of coins collected, etc.). In the save process, the processing section 21 transmits save data representing the results of the current game play to the server 1 by using the communication section 25. Upon receiving the save data, the server 1 stores the received save data, and further transmits, to the information processing device 2, draw result data representing a draw result of a first draw that is performed after the current game play. The processing section 21 receives the draw result data using the communication section 25 and stores the draw result data in the memory. After step S24, the processing section 21 ends the continuous play mode main process.

Note that in the present embodiment, the information processing device 2 has data used for generating fields in the continuous play mode (i.e., the basic field data and the partial field data) stored therein in advance (i.e., at least before the start of the continuous play mode). Then, in the continuous play mode main process, the processing section 21 makes no communication with the server 1 during a game play (specifically, during the execution of the process loop of steps S13, S14 and S19). Therefore, in the present embodiment, even when the information processing device 2 loses connection with the server 1 during a game play in the continuous play mode, the game can be played without discontinuing the game process.

Note that the information processing device 2 may communicate with the server 1 in the continuous play mode main process at a point in time that is not during a game play. For example, the information processing device 2 may communicate with the server 1 immediately after the start of the continuous play mode to execute processes such as transmitting save data, checking for updates, etc.

In other embodiments, the information processing device 2 may communicate with the server 1 during a game play in the continuous play mode. For example, the process of selecting a field segment (step S11) may be executed on the server 1. Then, the server 1 may transmit information representing the selected field segment (e.g., identification information of the field segment) to the information processing device 2, or may transmit data of the selected field segment to the information processing device 2.

Referring back to FIG. 10, when the continuous play mode main process of step S3 ends, the process of step S4 is executed. In step S4, the processing section 21 executes a first draw process. The first draw process is a process in which the user takes the first draw described above. In the first draw process, for example, after a special effect image for the draw is displayed on the display section 24, the processing section 21 executes the process of awarding an item to the user (or the player object 31) based on the draw result data received from the server 1. The process of step S5 is executed, following step S4.

In step S5, the processing section 21 determines whether or not to perform a second draw. That is, the processing section 21 obtains, from the input section 23, information representing an input by the user, and determines whether or not a touch input has been performed on the draw image 44 in the area image. Note that in the present embodiment, the user is allowed to take a second draw on the condition that a predetermined number of second coins are consumed, as described above. Therefore, when the number of second coins owned by the user is less than the predetermined number, the processing section 21 does not accept a touch input on the draw image 44 (in other words, an instruction to take a second draw). If the determination result of step S5 is affirmative, the process of step S6 is executed. On the other hand, if the determination result of step S5 is negative, the process of step S7 to be described later is executed, skipping the process of step S6.

In step S6, the processing section 21 executes a second draw process. That is, the processing section 21 uses the communication section 25 to send the server 1 a request for draw result data. Upon receiving the request, the server 1 transmits draw result data representing the result of the second draw to the information processing device 2. The processing section 21 receives the draw result data using the communication section 25 and stores the draw result data in the memory. Moreover, after a special effect image for the draw is displayed on the display section 24, the processing section 21 executes the process of awarding an item to the user (or the player object 31) based on the received draw result data. The process of step S7 is executed, following step S6.

In step S7, the processing section 21 determines whether or not to end the continuous play mode. That is, the processing section 21 ends the continuous play mode when the user gives a predetermined end instruction. On the other hand, when there is no predetermined end instruction from the user, the processing section 21 determines not to end the game. Note that the end instruction may be given by a touch input on an end button (not shown) included in the area image, for example. If the determination result of step S7 is negative, the process of step S1 is executed again. Thereafter, the series of steps S1 to S7 is executed repeatedly until it is determined to end the mode in step S7. On the other hand, if the determination result of step S7 is affirmative, the processing section 21 ends the continuous play mode process shown in FIG. 10.

4. Functions/Effects and Variations of Present Embodiment

As described above, in the present embodiment, the information processing system (more specifically, the information processing device 2) includes a generation unit (step S12) that generates fields for a plurality of stages, and a game process unit that executes a game process of controlling the player object in response to an operation by the user in the stages for which fields have been generated (step S13). The game process unit determines whether or not the user has cleared a stage (step S14,S19). Then, in response to the determination that the user has cleared the current stage, the game process unit starts the game process in the next stage following the current stage that has been cleared while maintaining the state of the player object at the time of clearing the current stage (step S21, S13). In response to the determination that the user has failed to clear the current stage, the game process unit starts the game process in the next stage following the current stage that the user has failed to clear (step S13).

With the configuration described above, according to the present embodiment, the user can experience a plurality of game stages in a single game play, and the game play is less likely to be monotonous. Since the next game stage is started irrespective of whether the user has cleared the current stage, the user can play the game uninterruptedly. According to the present embodiment, when the user clears the current stage, the next stage is started while maintaining the state of the player object, and it is therefore possible to maintain the continuity of game play. Therefore, the user can have various experiences by playing a plurality of stages in a single game play without losing the sense of immersion in the game as the continuity of game play is maintained. According to the present embodiment, when the user clears a stage, the "state of the player object", which has a large influence on the user experience, is maintained. Since the user is aware of the state of the player object most of the time during a game play, the user can more easily feel the continuity of the game by maintaining the state of the player object. As a result, the user can more clearly feel the uninterruptedness of the game.

Note that the state of the player object is maintained when the user clears a stage in the embodiment described above. Here, in other embodiments, a state relating to the game may be maintained when the user clears a stage. For example, in a type of a game in which no player object appears (e.g., a puzzle game), the information processing device 2 may maintain a play state of the game instead of maintaining the state of the player object. Specifically, when there is a time limit for a single game play (10 stages in the present embodiment), the remaining amount of time may be maintained as the play state of the game. Alternatively, the score of the game may be maintained as the play state of the game, for example.

The embodiment described above can be used, for example, as a game program, a game device, or the like, with the aim of making the game play less likely to be monotonous, for example.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium storing a game program to be executed on a computer of an information processing device, the game program causing the computer to execute:
    generating a game field for each of a plurality of game stages; and
    executing a game process of controlling a player object in response to an operation by a user in a game stage for which the game field has been generated, the execution of the game process comprising:
        determining whether the user has cleared or failed to clear the game stage;
        in response to a determination that the user has cleared the game stage, starting the game process for a first playable next game stage while maintaining a state of the player object at the time of clearing, the starting of the game process for the first playable next game stage including automatically placing the player object at a first start position in the first playable next game stage and automatically starting gameplay from the first start position; and
        in response to a determination that the user has failed to clear the game stage, starting the game process for a second playable next game stage, the starting of the game process for the second playable next game stage including automatically placing the player object at a second start position in the second playable next game stage and automatically starting gameplay from the second start position.

2. The non-transitory computer-readable storage medium according to claim 1, wherein in response to the determination that the user has failed to clear the game stage, the game process is started for the second next game stage while setting the state of the player object to an initial state.

3. The non-transitory computer-readable storage medium according to claim 1, wherein the game field of each game stage is generated by selecting, based on a predetermined probability, and using at least one of a plurality of game fields that are provided in advance.

4. The non-transitory computer-readable storage medium according to claim 1, wherein in response to the determination that the user has cleared or failed to clear a game stage, the game field for the first or second next game stage is generated.

5. The non-transitory computer-readable storage medium according to claim 4, wherein the game field generated for the first or second next game stage is varied between when it is determined that the user has cleared the game stage and when it is determined that the user has failed to clear the game stage.

6. The non-transitory computer-readable storage medium according to claim 4, wherein the game field for the first or second next game stage is determined based on the user's play result for the game stage.

7. The non-transitory computer-readable storage medium according to claim 1, wherein a single game play is ended on a condition that the number of game stages that the user has cleared or failed to clear or the number of game stages that the user has cleared has reached a predetermined number.

8. The non-transitory computer-readable storage medium according to claim 7, wherein the game process further comprises:
    ending a single game play on a condition that the number of game stages that the user has cleared or failed to clear has reached a predetermined number;
    calculating a numerical value representing a play result for each game stage during the single game play; and
    calculating, as a numerical value representing a play result for the single game play, a sum of the numerical values that have been calculated for the game stages during the single game play.

9. The non-transitory computer-readable storage medium according to claim 1, wherein the game process further comprises automatically advancing the game, independent of operations by the user, and controlling an action of the player object in response to an operation by the user.

10. The non-transitory computer-readable storage medium according to claim 9, wherein the automatic advancing of the game comprises moving the player object in a predetermined direction in the game field, and the controlling of the action of the player object in response to the operation by the user comprises causing the player object to make an action that is different from the movement of the player object in the automatic advancing.

11. The non-transitory computer-readable storage medium according to claim 1, wherein:
a game field including a goal therein is generated for each game stage; and
the game process further comprises determining that the user has cleared a game stage when the player object has reached the goal.

12. The non-transitory computer-readable storage medium according to claim 1, wherein the game process is started by placing the player object at a predetermined start position in the first or second next game stage, irrespective of whether there is an operation by the user, in response to a determination that the user has cleared or failed to clear the game stage.

13. The non-transitory computer-readable storage medium according to claim 1, wherein the first and second next game stages are the same.

14. An information processing device comprising one or more processors, the one or more processors executing:
generating a game field for each of a plurality of game stages; and
executing a game process of controlling a player object in response to an operation by a user in a game stage for which the game field has been generated, the execution of the game process comprising:
determining whether the user has cleared or failed to clear the game stage;
in response to a determination that the user has cleared the game stage, starting the game process for a first playable next game stage while maintaining a state of the player object at the time of clearing, the starting of the game process for the first playable next game stage including automatically placing the player object at a first start position in the first playable next game stage and automatically starting gameplay from the first start position; and
in response to a determination that the user has failed to clear the game stage, starting the game process for a second playable next game stage, the starting of the game process for the second playable next game stage including automatically placing the player object at a second start position in the second playable next game stage and automatically starting gameplay from the second start position.

15. The information processing device according to claim 14, wherein the first and second next game stages are the same.

16. An information processing system comprising one or more processors, the one or more processors executing:
generating a game field for each of a plurality of game stages; and
executing a game process of controlling a player object in response to an operation by a user in a game stage for which the game field has been generated, the execution of the game process comprising:
determining whether the user has cleared or failed to clear the game stage;
in response to a determination that the user has cleared the game stage, starting the game process for a first playable next game stage while maintaining a state of the player object at the time of clearing, the starting of the game process for the first playable next game stage including automatically placing the player object at a first start position in the first playable next game stage and automatically starting gameplay from the first start position; and
in response to a determination that the user has failed to clear the game stage, starting the game process for a second playable next game stage, the starting of the game process for the second playable next game stage including automatically placing the player object at a second start position in the second playable next game stage and automatically starting gameplay from the second start position.

17. The information processing system according to claim 16, wherein the first and second next game stages are the same.

18. A game processing method to be executed on an information processing system, the method comprising:
generating a game field for each of a plurality of game stages; and
executing a game process of controlling a player object in response to an operation by a user in a game stage for which the game field has been generated, the execution of the game process comprising:
determining whether the user has cleared or failed to clear the game stage;
in response to a determination that the user has cleared the game stage, starting the game process for a first playable next game stage while maintaining a state of the player object at the time of clearing, the starting of the game process for the first playable next game stage including automatically placing the player object at a first start position in the first playable next game stage and automatically starting gameplay from the first start position; and
in response to a determination that the user has failed to clear the game stage, starting the game process for a second playable next game stage, the starting of the game process for the second playable next game stage including automatically placing the player object at a second start position in the second playable next game stage and automatically starting gameplay from the second start position.

19. The method according to claim 18, wherein the first and second next game stages are the same.

* * * * *